United States Patent
Sun et al.

(10) Patent No.: US 10,983,542 B2
(45) Date of Patent: Apr. 20, 2021

(54) LOAD-PREDICTING AND CONTROL SYSTEM AND METHOD FOR SUBWAY HEATING, VENTILATION AND AIR CONDITIONING SYSTEM

(71) Applicant: Gree Electric Appliances, Inc. of Zhuhai, Zhuhai (CN)

(72) Inventors: Dongjun Sun, Guangdong (CN); Sheng Wang, Guangdong (CN); Juan Wang, Guangdong (CN); Guolin Liu, Guangdong (CN); Yusong Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 16/280,909

(22) Filed: Feb. 20, 2019

(65) Prior Publication Data

US 2019/0178522 A1  Jun. 13, 2019

Related U.S. Application Data

(63) Continuation of application No. PCT/CN2017/082142, filed on Apr. 27, 2017.

(30) Foreign Application Priority Data

Sep. 20, 2016 (CN) .......................... 201610836083.7

(51) Int. Cl.
*G05D 23/19* (2006.01)
*F24F 11/64* (2018.01)
(Continued)

(52) U.S. Cl.
CPC ..... *G05D 23/1931* (2013.01); *B61D 27/0072* (2013.01); *F24F 11/30* (2018.01);
(Continued)

(58) Field of Classification Search
CPC .. F24F 11/30; F24F 11/62; F24F 11/64; F24F 11/70; F24F 2110/00; F24F 2110/10;
(Continued)

(56) References Cited

U.S. PATENT DOCUMENTS 5,822,227 A * 10/1998 Ishikawa ................ G05D 27/02
                                                             703/9
8,892,277 B2 * 11/2014 Shiota ................ B61D 27/0072
                                                             701/19
(Continued)

FOREIGN PATENT DOCUMENTS

CN      101021914       8/2007
CN      101251291       8/2008
(Continued)

OTHER PUBLICATIONS

Extended European Search Report for EP Application No. 17852129.0 dated Sep. 5, 2019 (8 pages).

*Primary Examiner* — Crystal J Barnes-Bullock
(74) *Attorney, Agent, or Firm* — Brandon V. Zuniga; James R. Gourley; Carstens & Cahoon, LLP

(57) ABSTRACT

Disclosed is a load-predicting and control system for a subway heating, ventilation and air conditioning system. In one aspect, a load-predicting and control system for a subway heating, ventilation and air conditioning system is provided. The system includes a basic database, a sensing system, a load predicting unit, and a controller; the basic database stores historical data; the sensing system provides measured data; the load predicting unit calculates a predicted load value of the subway heating, ventilation and air conditioning based on the historical data and the measured data, and transmits the predicted load value to the controller; the controller issues a control command based on the predicted load value. Also provided is a load-predicting and control method for the subway heating, ventilation and air (Continued)

conditioning system. The present disclosure solves problems such as poor accuracy of conventional load prediction and inadequate control of the air conditioning system.

18 Claims, 4 Drawing Sheets

(51) Int. Cl.
| | | |
|---|---|---|
| *G05B 19/042* | (2006.01) | |
| *F24F 11/62* | (2018.01) | |
| *F24F 11/30* | (2018.01) | |
| *F24F 11/70* | (2018.01) | |
| *B61D 27/00* | (2006.01) | |
| *F24F 120/10* | (2018.01) | |
| *F24F 110/10* | (2018.01) | |
| *F24F 130/30* | (2018.01) | |
| *F24F 140/50* | (2018.01) | |
| *F24F 140/20* | (2018.01) | |
| *F24F 110/20* | (2018.01) | |
| *F24F 110/00* | (2018.01) | |
| *B60H 1/00* | (2006.01) | |

(52) U.S. Cl.
CPC ............. *F24F 11/62* (2018.01); *F24F 11/64* (2018.01); *F24F 11/70* (2018.01); *G05B 19/042* (2013.01); *G05D 23/1917* (2013.01); *G05D 23/1927* (2013.01); *B60H 2001/00733* (2019.05); *F24F 2110/00* (2018.01); *F24F 2110/10* (2018.01); *F24F 2110/20* (2018.01); *F24F 2120/10* (2018.01); *F24F 2130/30* (2018.01); *F24F 2140/20* (2018.01); *F24F 2140/50* (2018.01); *G05B 2219/2614* (2013.01); *Y02T 30/00* (2013.01)

(58) Field of Classification Search
CPC ............... F24F 2110/20; F24F 2120/10; F24F 2130/30; F24F 2140/20; F24F 2140/50; G05B 19/042; G05B 2219/2614; G05D 23/1917; G05D 23/1927; G05D 23/1931; G05D 27/02; B60H 2001/00733; B61D 27/00; B61D 27/0072; Y02T 30/42
See application file for complete search history.

(56) References Cited

U.S. PATENT DOCUMENTS

| | | | |
|---|---|---|---|
| 9,533,550 B2 * | 1/2017 | Kitamura | ........... B60H 1/00771 |
| 2004/0255601 A1 | 12/2004 | Kwon et al. | |
| 2015/0186906 A1 | 7/2015 | Chen | |
| 2015/0306937 A1 * | 10/2015 | Kitamura | ........... G05D 23/1931 |
| | | | 701/36 |
| 2015/0344044 A1 * | 12/2015 | Yuasa | ................ B60H 1/00821 |
| | | | 165/11.1 |
| 2016/0054019 A1 | 2/2016 | Lee | |
| 2016/0187896 A1 | 6/2016 | Jones | |

FOREIGN PATENT DOCUMENTS

| | | | | |
|---|---|---|---|---|
| CN | 102779228 | | | 11/2012 |
| CN | 102980272 | | | 3/2013 |
| CN | 106338127 | | | 1/2017 |
| JP | 2005042534 | A | * | 2/2005 |
| JP | 2014202468 | A | * | 10/2014 |

\* cited by examiner

LOAD-PREDICTING AND CONTROL SYSTEM AND METHOD FOR SUBWAY HEATING, VENTILATION AND AIR CONDITIONING SYSTEM

CROSS REFERENCE TO RELATED APPLICATIONS

This application is a continuation application of PCT Patent Application No. PCT/CN2017/082142, entitled "Load-Predicting and Control System and Method for Subway Heating, Ventilation and Air conditioning System", filed on Apr. 27, 2017, which claims priority to Chinese Patent Application No. 201610836083.7, entitled "Load-Predicting and Control System and Method for Subway Heating, Ventilation and Air conditioning System", filed on Sep. 20, 2016, the entire contents of which are incorporated herein by reference.

TECHNICAL FIELD

The present invention relates to the field of heating, ventilation and air conditioning technology, and more particularly, to a load-predicting and control system for a subway heating, ventilation and air conditioning system, and to a load-predicting and control method for a subway heating, ventilation and air conditioning system, which make improvements in load prediction.

BACKGROUND

During the operation of a subway, the heating, ventilation and air conditioning system operates all year round and has a long operating time, and the annual energy consumption of the subway is much greater than that of a common building, therefore, developing a new energy-saving control strategy for the subway heating, ventilation and air conditioning system is of great importance to reduce the energy consumption of the subway heating, ventilation and air conditioning system. Conventionally, a subway cold station is controlled by means of a PID negative feedback control, which has a serious hysteresis and may result in an oscillation of the control result, and the energy-saving control effects are not satisfactory.

There are currently some feedforward control methods, which mainly use load predicting means for the air conditioning system such as linear regression algorithm, neural network algorithm, and exponential smoothing algorithm, to achieve an advance control for the cold station. However, these load-predicting and control systems still have many defects when they are applied to the subway heating, ventilation and air conditioning system, for example, the linear regression method has a poor prediction accuracy, and the neural network algorithm has many limitations in engineering applications. The load of a subway building is difficult to predict and is more time-varying because the load is affected by uncontrollable factors such as external environment temperature and humidity, the heat dissipation of persons in the subway, and the loss of latent heat. Therefore, the accuracy of the building load prediction is the fundamental element to decide whether the feedforward control strategy for the air conditioning system is reasonable or not.

It should be noted herein that the technical contents provided in this section are intended to make the present invention better understood by those skilled in the art, but do not necessarily constitute the prior art.

SUMMARY OF THE INVENTION

In view of this, objectives of the present invention are to provide load-predicting and control system and method for a subway heating, ventilation and air conditioning system (such as a cold station), which solve problems such as poor accuracy of conventional load prediction and inadequate control of the air conditioning system.

In one aspect, the present invention provides a load-predicting and control system for a subway heating, ventilation and air conditioning system, including a basic database, a sensing system, a load predicting unit and a controller; wherein, the basic database is configured to store historical data relevant to the subway heating, ventilation and air conditioning system; the sensing system is configured to provide measured data relevant to the subway heating, ventilation and air conditioning system; the load predicting unit is configured to calculate a predicted load value of the subway heating, ventilation and air conditioning system based on the historical data and the measured data and output the predicted load value to the controller; the controller is configured to issue a control command based on the predicted load value, to control the subway heating, ventilation and air conditioning system to operate; and the historical data and the measured data include strong time-varying data.

In an embodiment, the strong time-varying data includes at least one of a real-time person number in a subway station, subway departure information (such as number of departures and time of departures), an environment temperature, and an environment humidity.

In an embodiment, weak time-varying data including ventilation of a subway station, equipment of a subway station, illumination of a subway station and/or temperature difference induced heat transfer of an enclosure structure of a subway station are excluded from the basic database to simplify the basic database.

In an embodiment, the subway heating, ventilation and air conditioning system is embodied as a subway cold station; and the historical data and/or the measured data further include load amount, a predicted load amount, a temperature of supplied chilled water, a temperature of returned chilled water and/or a flow rate of chilled water.

In an embodiment, the sensing system includes an access control based person number acquisition device configured to provide a real-time person number in the subway station.

In an embodiment, the sensing system includes a departure information detecting device; the departure information detecting device communicates with a vehicle operation management system, to obtain current subway departure information and/or future subway departure information.

In an embodiment, the historical data in the basic database is hourly data based on time series; and the load predicting unit predicts the load by adopting an exponential smoothing method.

In an embodiment, the load-predicting and control system further includes a plurality of data preprocessing modules; wherein, the measured data provided by the sensing system are, according to data properties, classified to be related to corresponding data preprocessing modules; and after being preprocessed by the data preprocessing modules, the measured data are transmitted to the controller, and/or stored in the basic database according to classification.

In an embodiment, the measured data provided by the sensing system are, according to classification, stored in corresponding data folders in the basic database, the data folders being classified according to attributions of season, date and/or instant; the data folders include a weekday data folder, a Saturday data folder, a Sunday data folder and/or a holiday data folder.

In an embodiment, the sensing system transmits the measured data to the load predicting unit, to predict the load; and the measured data are transmitted to the basic database by the sensing system and stored to act as historical data for a next load prediction.

In an embodiment, the sensing system further transmits the measured data to the controller, to enable the controller to issue a control command based on the predicted load value and the measured data.

In an embodiment, the subway heating, ventilation and air conditioning system is embodied as a subway cold station; the subway cold station includes at least one of following subway cold station devices: a cooling machine, a chilled water pump, a valve, a cooling water pump and a cooling tower; and the subway cold station further includes an actuator corresponding to the cold station device; the actuator receives the control command from the controller, to control the cold station device to operate.

In an embodiment, the subway heating, ventilation and air conditioning system further includes a load amount determining unit, which determines an actual load amount based on the measured data of the sensing system; and the load predicting unit revises a next predicted load of a next load prediction based on a difference between the predicted load value and the actual load amount fed back from the load amount determining unit.

In another aspect, the present invention provides a load-predicting and control method for a subway heating, ventilation and air conditioning system, load-predicting and control method calculates the predicted load value of the subway heating, ventilation and air conditioning system through the load-predicting and control system above, and controls the subway heating, ventilation and air conditioning system to operate based on the predicted load value.

In an embodiment, the load-predicting and control method includes steps of:

extracting load amounts of last two or more days from the basic database, and calculating average values of hourly load amounts of the last two or more days respectively;

calculating a horizontal factor of the last two or more days based on the average values of the hourly load amounts;

calculating a trend factor of the last two or more days based on the average values of the hourly load amounts;

calculating periodic factors for each of the last two or more days, and averaging and normalizing the periodic factors to get a normalized periodic factor;

transmitting, by the sensing system, a first measured real-time person number in a subway station and a first environment temperature to the load predicting unit, and calculating, by the load predicting unit, a first person number correction coefficient and a first temperature correction coefficient of a first load prediction;

calculating a first predicted load value, according to the horizontal factor, the normalized periodic factor, and the first person number correction coefficient and the first temperature correction coefficient of the first load prediction; and transmitting the first predicted load value to the controller; issuing, by the controller, the control command based on the first predicted load value, to control the subway heating, ventilation and air conditioning system to operate.

In an embodiment, the step of calculating the person number correction coefficient and the temperature correction coefficient of the first load prediction by the load predicting unit includes:

comparing the first measured real-time person number in the subway station and the first environment temperature obtained from the sensing system with corresponding historical data of a same instant of the last two or more days, to get the first person number correction coefficient and the first temperature correction coefficient of the first load prediction.

In an embodiment, the load-predicting and control method further includes steps of:

determining an actual load amount based on the measured data of the sensing system by a load amount determining unit of the subway heating, ventilation and air conditioning system after the first load prediction ends;

revising, by the load predicting unit, the horizontal factor and the normalized periodic factor based on a difference between the first predicted load value and the actual load amount fed back from the load amount determining unit, to obtain an updated horizontal factor and an updated normalized periodic factor;

transmitting, by the sensing system, a second measured real-time person number in the subway station and a second environment temperature to the load predicting unit, and calculating, by the load predicting unit, a second person number correction coefficient and a second temperature correction coefficient of a second load prediction;

calculating a second predicted load value, according to the updated horizontal factor, the updated normalized periodic factor, and the second person number correction coefficient and the second temperature correction coefficient of the second load prediction.

The load-predicting and control system and method for the subway heating, ventilation and air conditioning system provided by the present invention, on the basis of the historical information in combination with the measured information of future instants, calculate the predicted load value by adopting the improved seasonal exponential smoothing method, and output the predicted load value to control the cooling machine, the chilled water pump, the cooling water pump, the cooling tower, and so on. Moreover, the present invention continues revising the output capacity of the cooling machine according to the difference between the measured load amount of the building (the subway station) and the predicted load value, thereby improving the overall control effect of the subway cold station.

The present invention solves the problems such as poor prediction accuracy of the conventional load prediction and inadequate control of the air conditioning system, and also has the advantages such as saving initial investment, operating reliably, improving energy-saving effects of the heating, ventilation and air conditioning system, reducing data stored in the database, having a simple load predicting model, and having a high practicability.

BRIEF DESCRIPTION OF THE DRAWINGS

Through description for the embodiments of the present invention with reference to the accompanying figures, the objectives, features and advantages of the present invention will be more apparent, and in the following figures.

DETAILED DESCRIPTION OF THE PREFERRED EMBODIMENTS

The present invention will be described based on the embodiments, but is not limited to the embodiments.

Figure 1:
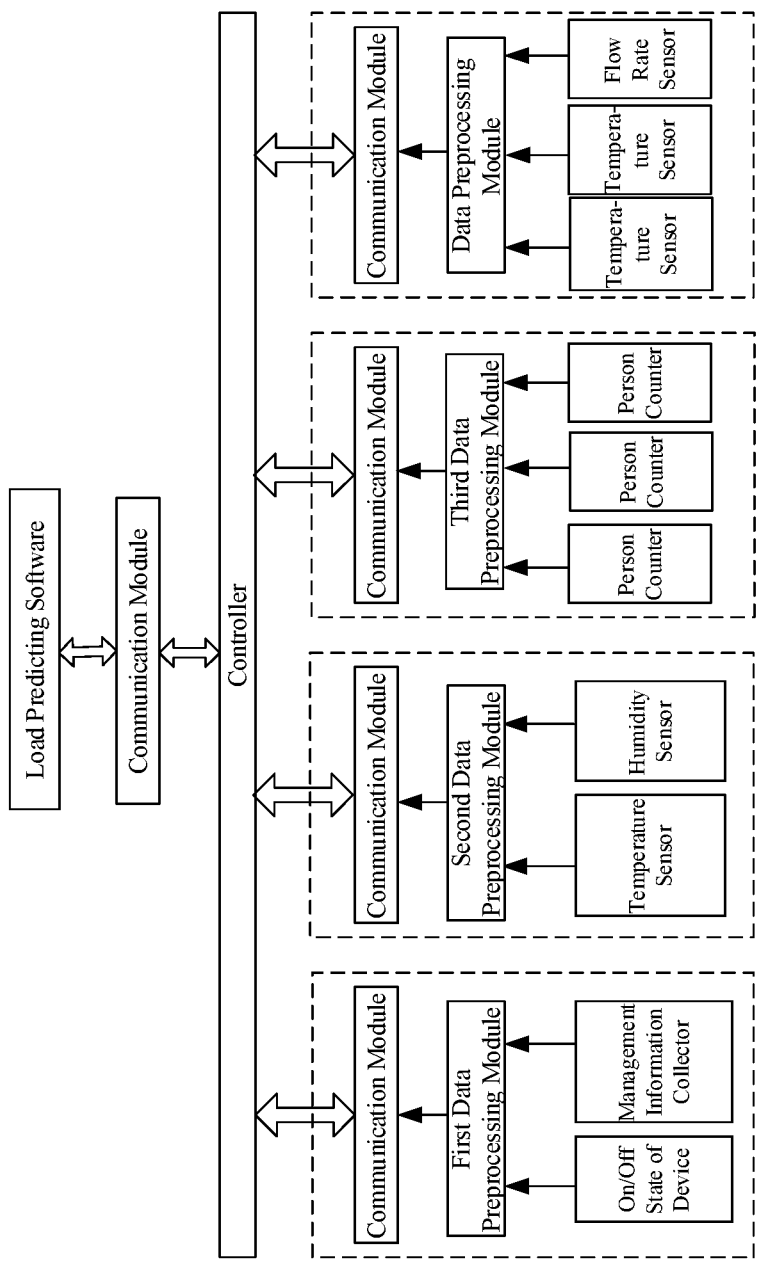
FIG. 1 is a schematic view illustrating the load-predicting and control system for a subway heating, ventilation and air conditioning system according to the present invention.
Figure 2:
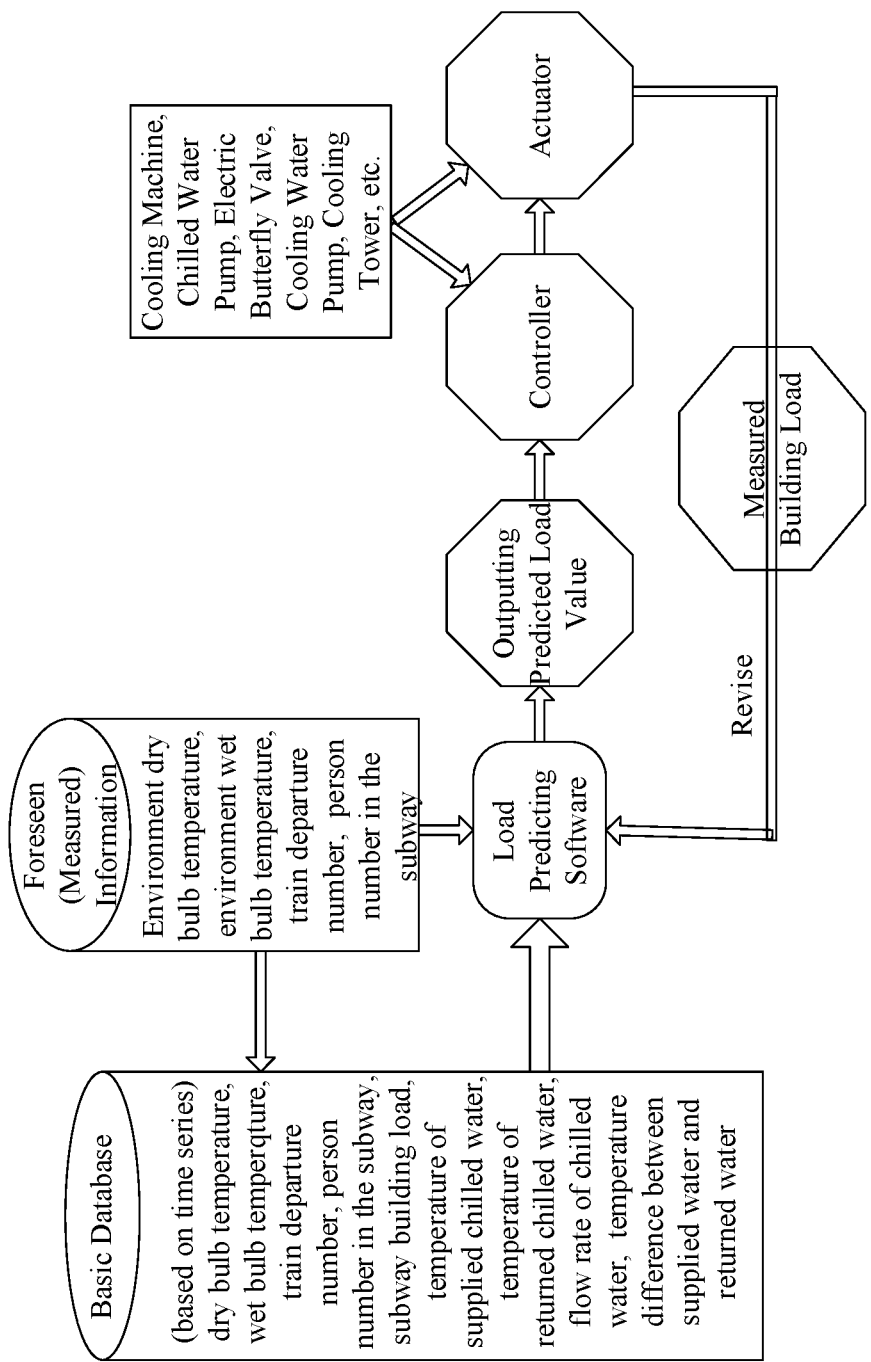
FIG. 2 is another schematic view illustrating the load-predicting and control system for the subway heating, ventilation and air conditioning system according to the present invention.

As shown in FIGS. 1 and 2, the present invention provides a load-predicting and control system for a subway heating, ventilation and air conditioning system (such as a cold station). The system includes a basic database, a load predicting software (a load predicting unit), and a controller. The basic database includes historical information (historical data). The historical information is transmitted to the load predicting software, thus the load predicting software can calculate a predicted load value based on the historical information and the measured information (measured data), and output the predicted load value. The controller issues an instruction based on the predicted load value, to perform a startup action. The load predicting software revises the predicted load value according to the measured building load (the subway load) which is fed back, and operates sequentially and circularly. Herein, the measured information may also be referred to be foreseen information.

The load-predicting and control system for the subway heating, ventilation and air conditioning system provided by the present invention conveniently integrates the historical information (original information) of the subway station, and can obtain the measured information (foreseen information) which will affect the building load of the subway cold station at future instants without additional large investment. The basic database is simplified as compared to the database of the traditional building load predicting model, and eliminating the weak time-varying influencing factors (i.e., the weak time-varying data) such as ventilation, solar radiation, equipment, illumination, temperature difference induced heat transfer of the enclosure structure, and so on.

In some embodiments, the load-predicting and control system for the subway heating, ventilation and air conditioning system further includes one or more of an actuator, a communication module, a person counter (e.g., an access control based person number acquisition device), a temperature sensor, a humidity sensor, a flow sensor, a data preprocessing module, and a departure information detecting device.

In some embodiments, the actuator feeds the measured building load back to the load predicting software. In other embodiments, the subway heating, ventilation and air conditioning system may further include a load amount determining unit, which is, for example, integrated in the controller or in the load predicting unit. The load amount determining unit determines the actual load amount based on measured data of a sensing system which is composed by various sensors and a part of which may be connected in a corresponding actuator. Thus, the load predicting unit revises the next predicted load of the next load prediction based on the difference between the predicted load value and the actual load amount fed back from the load amount determining unit.

The temperature sensor and the humidity sensor respectively collect meteorological parameters (e.g., dry bulb temperature, relative humidity); the meteorological parameters are transmitted to the data preprocessing module, to obtain meteorological data corresponding to environment temperature and environment humidity, and stored in the basic database.

The person number counter obtains the real-time person number at the current instant from the control console of the subway station. After being processed, the real-time person number is stored in the basic database.

The departure information detecting device determines the pair number of the subway departure from the subway station for the next instant.

The data preprocessing modules include a first data preprocessing module, a second data preprocessing module, a third data preprocessing module, and a fourth data preprocessing module. However, it should be understood that the number of the data pre-processing modules is not limited thereto. The data processed by the first data preprocessing module may include a start/stop state of a device, and management information; the data processed by the second data pre-processing module may include temperature and humidity; the data processed by the third data pre-processing module may include the person number; the data processed by the fourth data preprocessing module may include temperature and flow rate (such as a temperature of supplied chilled water, a temperature of returned chilled water, a flow rate of chilled water, a temperature of cooling water, and a flow rate of cooling water).

The operation data of the cold station acquired by the temperature sensor and the flow sensor are processed by the data preprocessing module, and then transmitted to the controller, to be used as a basis for the control command. The calculated cold load is stored in the basic database.

In an embodiment, the controller controls the actuator, and the actuator issues an instruction to control one or more of the cooling machine, the chilled water pump, the cooling water pump, the cooling tower, and the valve (such as an electric butterfly valve), thereby realizing a precise supply of cold amount for the subway cold station.

In an embodiment, the basic database includes a meteorological parameter file and a subway person number data file. The dry bulb temperature and the relative humidity are stored in the meteorological parameter file, and the real-time person number at the current instant is stored in the subway person number data file.

In some embodiments, after the load predicting software is started, it automatically starts the load predicting calculation according to a preset air conditioning time period, obtains the corresponding historical data from the basic database, inputs the real-time person number, the dry bulb temperature, the relative humidity and the measured cold load, which can be directly measured or obtained through calculation, to calculate the predicted load value of the next instant, and transmits the predicted load value to the controller via the communication module. According to the predicted load value, the controller calculates the number of the cooling machines, the chilled water pumps, the cooling water pumps, the cooling towers and the electric butterfly valves to be started; and according to the preset time, the controller issues a start command, to perform a startup action. Through issuing a control command, the controller can also control the capacity rate of each of the cold station devices (for example, for a variable frequency water pump, its output capacity can be adjusted by controlling the frequency of the variable frequency water pump). When the next predicted value is not obtained, according to the difference between the previous predicted value and the measured value, the controller adjusts the cold supply amount of the cold station through regulating, for example, the flow rate of the cooling water and the flow rate of the chilled water, and so on. After obtaining the next predicted value output by the load predicting software, according to the difference between the next predicted value and the measured value, the controller further regulates the output amount of the cooling machine, the flow rate of the cooling water and the flow rate of the chilled water, to realize a feedforward control.

Through using the existing resources of the subway station, the present invention can easily determine the person number, the information of the subway departure, the temperature and the humidity, so it is very simple to collect the key information for the future instants, and the cost can be reduced.

In an embodiment, a fuzzy relational expression between the subway building load and the historical information (data) and/or the measured information (data) is established, which improves the accuracy of the building load prediction.

In an embodiment, the historical information includes at least one of the dry bulb temperature, the wet bulb temperature, the number of the train departure, the person number in the subway station, the building load of the subway station, the temperature of the supplied chilled water and the returned chilled water, the flow rate of the chilled water, and a temperature difference between the temperature of the supplied chilled water and the temperature of the returned chilled water. The subway cold station has a lot of historical information, which is easy to collect, thereby improving the accuracy of the building load prediction, and reducing the cost of collecting historical information.

In an embodiment, the measured information includes at least one of the dry bulb temperature of the environment, the wet bulb temperature of the environment, the number of the train departure, the real-time person number in the subway station. The real-time person number in the subway station can be accurately counted by the person number counter of the access control system, and the vehicle operation management system has determined the pair number of the subway departure during the next time period (time required for the chilled water to cycle once), so it is very convenient to collect data. Herein, it should be noted that, as compared with the weak time-varying influencing factors such as ventilation, solar radiation, equipment, illumination, temperature difference induced heat transfer of the enclosure structure and so on, the real-time person number in the subway station, the subway departure information, the environment temperature and the environment humidity will vary greatly over time. For example, during the morning and evening rush hours of a weekday, the real-time person number in the subway station is larger, while at noon in summer, the environment temperature is higher. Therefore, these data are referred to in short as strong time-varying data in this patent application.

Figure 3:
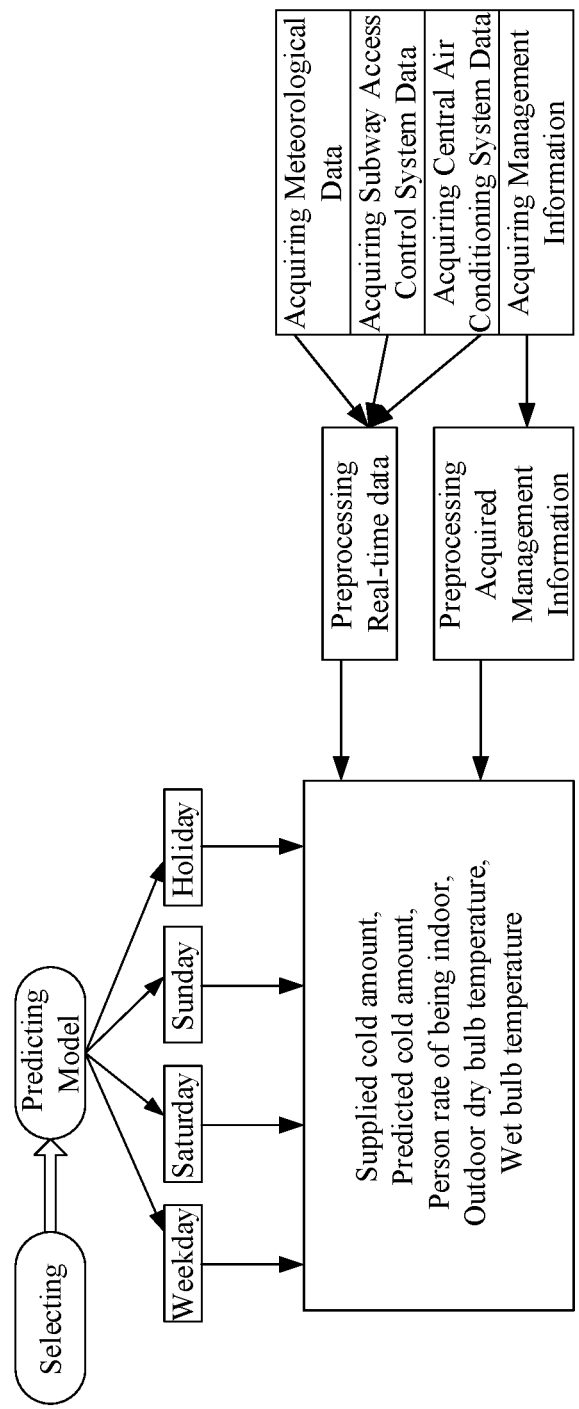
FIG. 3 is a schematic view illustrating data acquiring, preprocessing and storing processes of the load-predicting and control method for the subway heating, ventilation and air conditioning system according to the present invention.

As shown in FIG. 3, according to the present invention, the load-predicting and control method for a subway heating, ventilation and air conditioning system may include a data acquiring and integrated processing stage and a predicting and calculating stage.

The data acquiring and integrated processing stage may include: collecting data; and storing the data in different data folders in the basic database according to different classifications, namely, pre-setting classifications of the cold load data.

The predicting and calculating stage includes the following steps:

according to a user's requirement, preset the predicting interval in the software program; extract the measured cold loads Q(t) of the last two days d(n−1) and d(n−2) from the basic database of the prediction days; calculate average cold loads $\overline{Q}_{j-1}$ and $\overline{Q}_{j-2}$ of the hourly measured cold loads of the last two days respectively. Herein, it should be noted that the hourly measured cold loads may be measured in the last day or in the last few days more than two.

Transmit the measured real-time indoor person number in the subway and the measured real-time outdoor temperature to the load predicting model, to calculate the atmospheric temperature correction coefficient ζ(1) and the number correction coefficient ξ(1) of the indoor person of the first load prediction; then calculate the first predicted load Q(1) of the prediction day; meanwhile, store the measured cold load, the meteorological parameters and the person number in the subway in a corresponding data folder for backup.

According to the preset first advancing air-conditioning time τ1, the cycle period τ of the chilled water and the predicted load value, the controller issues a start command in advance (for example, (τ+τ1) in advance).

After the first load prediction instant ends, and after the measured cold amount Q'(1) of the subway cold station is obtained, transmit the measured real-time indoor person number in the subway and the measured real-time outdoor temperature to the load predicting model, and the load predicting model calculates the second predicted load value Q(2) of the prediction day. Meanwhile, store the measured cold load, the meteorological parameters, and the measured person number in the subway in the corresponding data folder for backup.

Adopting the same predicting method as the method adopted at the second instant, the cold load demands at the subsequent instants are sequentially predicted, and after the prediction at the last air conditioning instant ends, the controller of the cold station issues a shutdown command, to end load predicting of a day.

In an embodiment, the data folder includes a weekday data folder, a Saturday data folder, a Sunday data folder and a holiday data folder, wherein, each type of folder includes at least one of the historical meteorological parameters, historical indoor person number, and historical cold load data, and historical predicted cold load data.

In an embodiment, the average values of hourly measured cold loads of the last two days are $$\overline{Q}_{j-1} = \frac{1}{N}\sum_{i=1}^{N} X_{i,j-1} \text{ and } \overline{Q}_{j-2} = \frac{1}{N}\sum_{i=1}^{N} X_{i,j-2}$$

respectively;

the horizontal factor of the two load prediction days is $$S = (\overline{Q}_{j-1} + \overline{Q}_{j-2})/2;$$

the trend factor of the two load prediction days is $$B = \frac{\overline{Q}_{j-1} - \overline{Q}_{j-2}}{N};$$

wherein, N represents the number of the cold load prediction points for a load prediction day (e.g., N=1, 2, 3 . . . 24);

calculate the periodic factors Ct(j−1, i) and Ct(j−2, i) for each load prediction day, and average and normalize them to get Ct(i);

calculate the atmospheric temperature correction coefficient ζ(1) and the indoor person number correction coefficient ξ(1) of the first load prediction, and the first predicted load value of the prediction day is Q(1)=ζ(1)*ξ(1)*Ct(1)*S.

In an embodiment, after the first load prediction instant, and after the measured cold amount Q'(1) of the subway cold station is obtained, revise the horizontal factor S and the periodic factor to obtain the updated St(i) and Ct(i);

according to the measured real-time indoor person number in the subway and the outdoor temperature, calculate the atmospheric temperature correction coefficient ζ and the indoor person number correction coefficient ξ of the second load prediction, and the second predicted load value of the prediction day is $$Q(2)=\zeta*\xi*Ct(2)*St(2).$$

In an embodiment, the data acquiring and integrated processing stage includes:

a data acquiring stage, including acquiring meteorological data, access control system data, central air-conditioning system data and management information;

a data preprocessing stage, including implementing data preprocessing and management information preprocessing;

a data storing (obtaining) stage, including selecting the predicting model first, and storing the cold amount, the predicted cold amount value, the indoor person rate of being indoor, the outdoor dry bulb temperature and the wet bulb temperature in the load predicting model.

Figure 4:
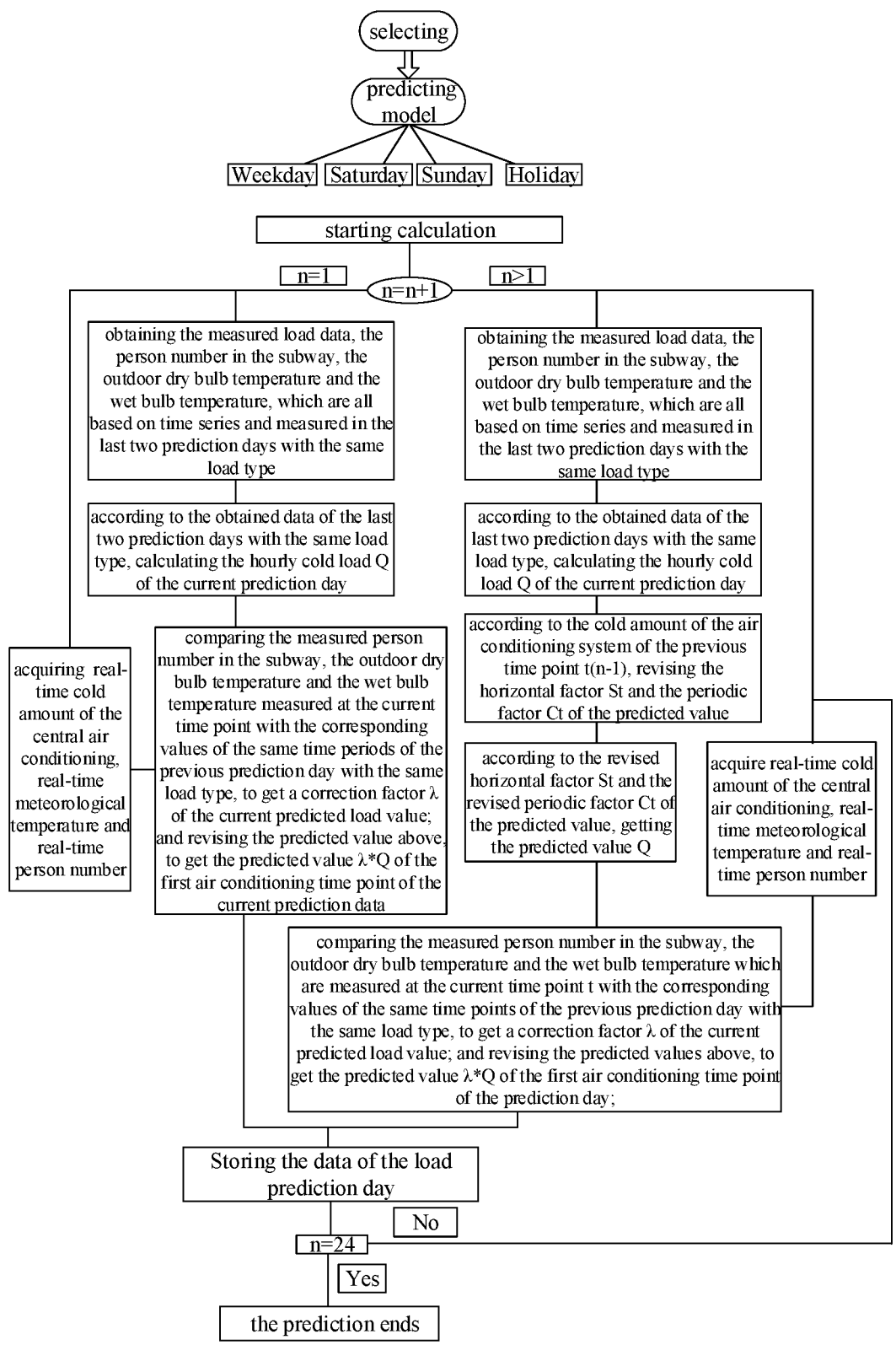
FIG. 4 is a schematic flow chart illustrating the load-predicting and control method for a subway heating, ventilation and air conditioning system according to the present invention.

Another embodiment of the load-predicting and control method for the subway heating, ventilation and air conditioning system as shown in FIG. 4 includes the following steps:

select the predicting model, and start the calculation;

when N=1, obtain the measured load data, the person number in the subway, the outdoor dry bulb temperature and the wet bulb temperature, which are all based on time series and measured in the last two prediction days with the same load type;

according to the obtained data of the last two prediction days with the same load type, calculate the hourly cold load Q of the current prediction day;

acquire real-time cold amount of the central air conditioning, real-time meteorological temperature and real-time person number; compare the measured person number in the subway, the outdoor dry bulb temperature and the wet bulb temperature measured at the current instant with the corresponding values of the same time periods of the previous prediction day with the same load type, to get a correction factor λ of the current predicted load value; and revise the predicted value above, to get the predicted value λ*Q of the first air conditioning instant of the current prediction day;

store the data of the load prediction day;

if N=24, the prediction ends;

if N≠24, return to the case of N>1, and continue to operate;

if N>1, obtain the measured load data, the person number in the subway, the outdoor dry bulb temperature and the wet bulb temperature, which are all based on time series and measured in the last two prediction days with the same load type;

according to the obtained data of the last two prediction days with the same load type, calculate the hourly cold load Q of the prediction day;

according to the cold amount of the air conditioning system of the previous instant t(n−1), revise the horizontal factor St and the periodic factor Ct of the predicted value;

according to the revised horizontal factor St and the revised periodic factor Ct of the predicted value, get the predicted value Q;

acquire the real-time cold amount of the central air conditioning, the real-time meteorological temperature, the real-time person number; compare the measured person number in the subway, the outdoor dry bulb temperature and the wet bulb temperature which are measured at the current instant t with the corresponding values of the same instants of the previous prediction day with the same load type, to get a correction factor λ of the current predicted load value; and revise the predicted values above, to get the predicted value λ*Q of the first air conditioning instant of the prediction day;

store the data of the load prediction day;

if N=24, the prediction ends;

if N≠24, return to the case of N>1, and continue to operate; cycle sequentially till N=24; and the prediction ends.

The load-predicting and control system and method for the subway heating, ventilation and air conditioning system provided by the present invention make advantages of the existing data and information of the subway cold station to obtain the measured information (foreseen information) which will affect the building load of the subway cold station at future instants, without additional large investment. An improved seasonal exponential smoothing method is applied to calculate the building load of the subway station of the next instant (time required for the chilled water to cycle once). The load-predicting and control system for the subway heating, ventilation and air conditioning system issues control commands to control the cooling machine, the chilled water pump, the cooling water pump, the cooling tower and the electric butterfly valve, thereby realizing a precise air conditioning for the subway cold station.

The load-predicting and control system and method for the subway heating, ventilation and air conditioning system provided by the present invention can solve the problems such as poor prediction accuracy of the conventional load prediction and inadequate control for the heating, ventilation and air conditioning system, also have the advantages of saving initial investment, having little application difficulty, operating reliably, improving energy-saving effects of the heating, ventilation and air conditioning system, reducing data stored in the database, having a simple load predicting model, and having high practicability.

What described above are preferred embodiments of the present invention, and they are not intended to limit the scope of the present invention. For those skilled in the art, various modifications and changes can be made for the present invention. Various modifications, equivalent substitutions and improvements can be made without departing from the sprits and principles of the present invention, and they are within the protection scope of the present invention.

What is claimed is:

1. A load-predicting and control system for a subway station heating, ventilation and air conditioning system, comprising a basic database, a sensing system, a load predicting unit and a controller;

wherein: (i) the basic database is configured to store historical data of the subway station heating, ventilation and air conditioning system; (ii) the sensing system is configured to provide measured data of the subway station heating, ventilation and air conditioning system; (iii) the load predicting unit is configured to calculate a predicted load value of the subway station heating, ventilation and air conditioning system based on the historical data and the measured data, and output the predicted load value to the controller; (iv) the controller is configured to issue a control command based on the predicted load value, to control the operation of the subway station heating, ventilation and air conditioning system; and the historical data and the measured data comprise at least one of a real-time person number in a subway station, subway train departure information, an environment temperature, and an environment humidity;

the subway station heating, ventilation and air conditioning system further comprises a load amount determining unit, which determines an actual load amount based on the measured data of the sensing system; and the load predicting unit revises a next predicted load of a next load prediction based on a difference between the predicted load value and the actual load amount fed back from the load amount determining unit.

2. The load-predicting and control system according to claim 1, wherein ventilation of a subway station, equipment of a subway station, illumination of a subway station and/or temperature difference induced heat transfer of an enclosure structure of a subway station are excluded from the basic database to simplify the basic database.

3. The load-predicting and control system according to claim 1, wherein:

the subway station heating, ventilation and air conditioning system is embodied as a subway cold station; and the historical data and/or the measured data further comprise a load amount, a predicted load amount, a temperature of supplied chilled water, a temperature of returned chilled water and/or a flow rate of chilled water.

4. The load-predicting and control system according to claim 1, wherein the sensing system comprises an access control based person number acquisition device configured to provide a real-time person number in the subway station.

5. The load-predicting and control system according to claim 1, wherein: (i) the sensing system comprises a departure information detecting device; and (ii) the departure information detecting device is configured to communicates with a vehicle operation management system, to obtain current subway train departure information and/or future subway train departure information.

6. The load-predicting and control system according to claim 1, wherein: (i) the historical data in the basic database are hourly data based on time series; and (ii) the load predicting unit predicts the load by adopting an exponential smoothing method.

7. The load-predicting and control system according to claim 1, further comprising a plurality of data preprocessing modules; wherein the load-predicting and control system is configured so that:

the measured data provided by the sensing system are, according to data properties, classified to be related to corresponding data preprocessing modules; and after being preprocessed by the data preprocessing modules, the measured data are transmitted to the controller, and/or stored in the basic database according to classification.

8. The load-predicting and control system according to claim 1, wherein the load-predicting and control system is configured so that (i) the measured data provided by the sensing system are, according to classification, stored in corresponding data folders in the basic database, the data folders being classified according to attributions of season, date and/or instant; and (ii) the data folders comprise a weekday data folder, a Saturday data folder, a Sunday data folder and/or a holiday data folder.

9. The load-predicting and control system according to claim 1, wherein: (i) the sensing system is configured to transmits the measured data to the load predicting unit, to predict the load; and (ii) the load-predicting and control system is configured so that the measured data are transmitted to the basic database by the sensing system and stored to act as historical data for a next load prediction.

10. The load-predicting and control system according to claim 9, wherein the sensing system is configured to further transmits the measured data to the controller, to enable the controller to issue a control command based on the predicted load value and the measured data.

11. The load-predicting and control system according to claim 1, wherein:

the subway station heating, ventilation and air conditioning system is embodied as a subway cold station; the subway cold station comprises at least one of following subway cold station devices: a cooling machine, a chilled water pump, a valve, a cooling water pump and a cooling tower; and the subway cold station further comprises an actuator corresponding to the cold station device; the actuator configured to receive the control command from the controller, to control the operation of the cold station device.

12. A load-predicting and control method for a subway heating, ventilation and air conditioning system, comprising:

calculating the predicted load value of the subway heating, ventilation and air conditioning system through the load-predicting and control system as defined in claim 1, and controlling the operation of the subway heating, ventilation and air conditioning system based on the predicted load value.

13. The load-predicting and control method according to claim 12, comprising steps of:

extracting load amounts of the last two or more days from the basic database, and calculating average values of hourly load amounts of the last two or more days respectively, calculating a horizontal factor of the last two or more days based on the average values of the hourly load amounts, calculating a trend factor of the last two or more days based on the average values of the hourly load amounts, calculating periodic factors for each of the last two or more days, and averaging and normalizing the periodic factors to get a normalized periodic factor, transmitting, by the sensing system, a first measured real-time person number in a subway station and a first environment temperature to the load predicting unit, and calculating, by the load predicting unit, a first person number correction coefficient and a first temperature correction coefficient of a first load prediction, calculating a first predicted load value, according to the horizontal factor, the normalized periodic factor, and the first person number correction coefficient and the first temperature correction coefficient of the first load prediction, and transmitting the first predicted load value to the controller, and issuing, by the controller, the control command based on the first predicted load value, to control the operation the subway heating, ventilation and air conditioning system.

14. The load-predicting and control method according to claim 13, wherein, the step of calculating, by the load predicting unit, the person number correction coefficient and the temperature correction coefficient of the first load prediction further comprises comparing the first measured real-time person number in the subway station and the first environment temperature obtained from the sensing system with corresponding historical data at a same instant of the last two or more days, to get the first person number correction coefficient and the first temperature correction coefficient of the first load prediction.

15. The load-predicting and control method according to claim 13, characterized by further comprising steps of:
   after the first load prediction ends, determining an actual load amount based on the measured data of the sensing system by a load amount determining unit of the subway heating, ventilation and air conditioning system,
   revising, by the load predicting unit, the horizontal factor and the normalized periodic factor based on a difference between the first predicted load value and the actual load amount fed back from the load amount determining unit, to obtain an updated horizontal factor and an updated normalized periodic factor,
   transmitting, by the sensing system, a second measured real-time person number in the subway station and a second environment temperature to the load predicting unit, and calculating, by the load predicting unit, a second person number correction coefficient and a second temperature correction coefficient of a second load prediction,
   calculating a second predicted load value, according to the updated horizontal factor, the updated normalized periodic factor, and the second person number correction coefficient and the second temperature correction coefficient of the second load prediction.

16. The load-predicting and control method according to claim 14, characterized by further comprising steps of:
   after the first load prediction ends, determining an actual load amount based on the measured data of the sensing system by a load amount determining unit of the subway heating, ventilation and air conditioning system;
   revising, by the load predicting unit, the horizontal factor and the normalized periodic factor based on a difference between the first predicted load value and the actual load amount fed back from the load amount determining unit, to obtain an updated horizontal factor and an updated normalized periodic factor;
   transmitting, by the sensing system, a second measured real-time person number in the subway station and a second environment temperature to the load predicting unit, and calculating, by the load predicting unit, a second person number correction coefficient and a second temperature correction coefficient of a second load prediction,
   calculating a second predicted load value, according to the updated horizontal factor, the updated normalized periodic factor, and the second person number correction coefficient and the second temperature correction coefficient of the second load prediction.

17. The load-predicting and control method according to claim 12, wherein, weak time-varying data including ventilation of a subway station, equipment of a subway station, illumination of a subway station and/or temperature difference induced heat transfer of an enclosure structure of a subway station are excluded from the basic database to simplify the basic database.

18. The load-predicting and control method according to claim 12, wherein:
   the load-predicting and control system further comprises a plurality of data preprocessing modules,
   the measured data provided by the sensing system are, according to data properties, classified to be related to corresponding data preprocessing modules, and
   after being preprocessed by the data preprocessing modules, the measured data are transmitted to the controller, and/or stored in the basic database according to classification.

* * * * *

UNITED STATES PATENT AND TRADEMARK OFFICE
CERTIFICATE OF CORRECTION

PATENT NO. : 10,983,542 B2  
APPLICATION NO. : 16/280909  
DATED : April 20, 2021  
INVENTOR(S) : Dongjun Sun et al.

Page 1 of 1

It is certified that error appears in the above-identified patent and that said Letters Patent is hereby corrected as shown below:

In the Claims

Column 11, Line 43, Claim 5 replace "to communicates" with --to communicate--.

Column 12, Line 7, Claim 9 replace "transmits the measured data" with --transmit the measured data--.

Column 12, Line 14, Claim 10 replace "transmits the measured data" with --transmit the measured data--.

Column 12, Line 44, Claim 13 replace "respectively," with --respectively;--.

Column 12, Line 66, Claim 13 replace "operation the subway heating," with --operation of the subway heating,--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*